United States Patent [19]

Phillips

[11] Patent Number: 5,121,973
[45] Date of Patent: Jun. 16, 1992

[54] PUSH BUTTON QUICK RELEASE SAFETY HUB ASSEMBLY

[75] Inventor: Cal M. Phillips, North Miami Beach, Fla.

[73] Assignee: S.A.F.E. Q-R Corp., Fla.

[21] Appl. No.: 710,962

[22] Filed: Jun. 6, 1991

[51] Int. Cl.$^5$ ............................................. B60B 21/00
[52] U.S. Cl. ................................. 301/105 B; 301/111
[58] Field of Search .................... 301/105 B, 111, 114; 70/233

[56] References Cited

U.S. PATENT DOCUMENTS

| | | | |
|---|---|---|---|
| 2,630,020 | 3/1953 | Juy | 301/105 B |
| 3,922,018 | 11/1975 | Shook | 301/114 X |
| 4,033,627 | 7/1977 | Morroni | 301/111 |
| 4,079,958 | 3/1978 | Segawa | 280/279 |
| 4,400,038 | 8/1983 | Hosokawa | 301/111 |
| 4,679,862 | 7/1987 | Luo | 301/112 |
| 4,724,692 | 2/1988 | Turin et al. | 70/225 |
| 4,770,011 | 9/1988 | Constant | 70/225 |
| 4,789,206 | 12/1988 | Ozaki | 301/111 |
| 4,805,941 | 2/1989 | Downing et al. | 280/279 |
| 4,906,053 | 3/1990 | Kawai | 301/105 |
| 4,964,287 | 10/1990 | Gaul | 70/233 |

FOREIGN PATENT DOCUMENTS

| | | | |
|---|---|---|---|
| 964622 | 8/1950 | France | 301/125 |
| 441058 | 10/1948 | Italy | 301/111 |
| 460058 | 10/1950 | Italy | 301/111 |
| 341220 | 1/1931 | United Kingdom | 301/125 |

Primary Examiner—Russell D. Stormer

[57] ABSTRACT

A push-button quick release safety hub comprising of a pair of supports (12) each having an opening (18) on one end with a coupling surface (14) on the exterior end of the supports (12). Sliding members (40), (41) encase each axle end (28) and slide to interlock with the coupling surfaces (14) of the supports (12). A spring (44) encased within each sliding member (40), (41) urges the member toward the outer end of the coupling surface (14) of the support (12). A connecting rod (48) in the center of the axle (26) is attached to the sliding member (40). A push-button (52) is attached to the other end of the connecting rod (48). The other sliding member (41) has an outer lip (42) and encases the push-button (52). While pressing the push-button (52) with your thumb and pulling the outer lip (42) on the sliding member (41) with your two fingers, the sliding members (40), (41) will be disengaged from the coupling surfaces (14) of the supports (12), and then the hub assembly can be removed. Mounting tapers (16) on supports (12) allows easy entry for the hub assembly. When pushing the supports (12) towards the hub assembly, the sliding members (40), (41) will be urged outward. When the sliding members (40), (41) align with coupling surfaces (14) of the supports (12), the springs (44) will urge the sliding members (40), (41) inward and automatically secure and center the hub assembly to the supports (12). Also, a locking device including locking pin (54) operated by key (56), which serves as a security measure against unauthorized wheel removal.

16 Claims, 4 Drawing Sheets

PUSH BUTTON QUICK RELEASE SAFETY HUB ASSEMBLY

BACKGROUND—FIELD OF INVENTION

This invention relates to a push-button quick release safety hub assembly secured to a pair of supports, such as a bicycle frame. The push-botton quick release safety hub is a new, easy-to-use concept to prevent unexpected wheel loss.

BACKGROUND—DESCRIPTION OF PRIOR ART

Heretofore, quick release clamping assemblies for bicycles were utilized to enable quick removal of the wheel when necessary. This quick change capablility allows ease in changing flat tires and can be used to facilitate more convenient storage and transport of bicycles.

Unfortunately, a common problem that occurs with the quick release devices is that they frequently are not tightened properly, are adjusted incorrectly, or malfunction, resulting in unexpected wheel loss.

Traditional nut and bolt assemblies are also subject to loosening and unexpected wheel loss. This can lead to loss of control and a potential accident. Thus, bicycle product liability suits are plaguing the industry.

The quick release assembly in U.S. Pat. No. 4,789,206 to Ozaki (1988) has the disadvantage that the hub can be improperly aligned and can unexpectedly release itself, due to inadequate tightening or incorrect wheel installation. Gaul's (1990) quick release assembly, U.S. Pat. No. 4,964,287 is also subject to the previously mentioned disadvantages, and his locking mechanism is developed for lever assmbly locking a quick release cam, rather than a sliding member assembly. In addition, it requires pin alignment with frame and center rod can loosen and fall off, if installed improperly.

In U.S. Pat. No. 4,805,941 to Downing and Dietz (1989), the quick released wheel retainer is extraneous and can be disposed of by operator. In addition, wheel can be misaligned or improperly installed. In U.S. Pat. No. 4,079,958 of Segawa (1978) the rod may loosen totally, resulting in wheel loss. Wheel alignment must also be performed manually.

All other previous quick release devices are difficult for the less mechanically oriented user to operate properly. Incorrect positioning of the lever and misalignment of wheel are the most frequent errors. These errors result in unexpected loss of the wheel and thus potential accidents and serious injuries may result. Thus, any advantages of these quick release clamping assemblies may are offset by critical disadvantages. The lever design has been developed with variations, but always functions in the same manner.

OBJECTS AND ADVANTAGES

Accordingly, objects or advantages of my invention include:
a) to safely secure the hub assembly to the supports;
b) to provide a push-button quick release type assembly which allows ready and easy removal of hub when needed;
c) to provide a simple, quick one step process for removal of hub assembly which is achieved in the following manner: while pressing the push-button with your thumb and pulling the lip on the sliding member with your two fingers, one can remove the hub assembly from its supports. To install hub assembly, align supports with hub assembly and push together. Hub assembly will automatically center and secure itself to the supports;
d) to provide a system in which no additional adjustments, alignment, loosening, tightening or mechanical expertise are needed;
e) to provide perfect wheel alignment each and every time, with no need to adjust or estimate wheel alignment;
f) to provide a hub assembly that is smaller and lighter than previous assemblies;
g) to provide a quick release hub assembly requiring a very minimal amount of strength to positively secure hub assembly to supports—the entire operation can be completed with one hand;
h) to provide a quick release safety hub assembly which eliminates use of all bolts, washers, screws and nuts, thus eliminating loosening and malfunction problems. The push-button quick release safety hub assembly is unique in its reliance on spring tension to mount and hold hub assembly.
i) to provide a push-button quick release safety hub which is easy and inexpensive to manufacture.

Further objects, features and advantages of the present invention will become apparent from a consideration of the drawings and ensuing description of it.

DRAWING FIGURES

REFERENCE NUMERALS IN DRAWINGS

Figure 1:
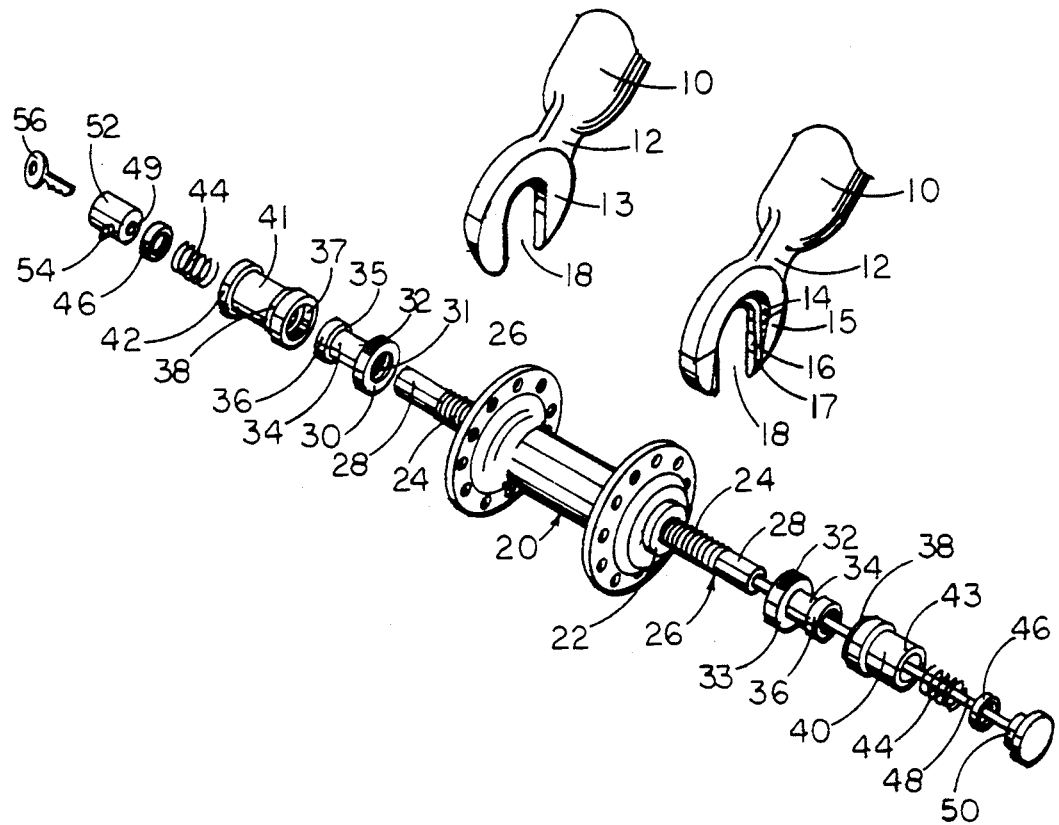
FIG. 1 shows an exploded isometric view of the push-button quick release safety hub.

10 bicycle fork
12 support for hub assembly
13 inner face of support
14 coupling surface on support
15 mounting ramp on support
16 mounting taper on support
17 channel on support
18 open ended slot on support
20 bicycle hub
21 bearings for bicycle hub
22 bearing race
24 threaded portion of axle
26 axle
28 outer end of axle
30 inner face of support guide
31 internal threads on support guide
32 flats on support guide
33 lip on support guide
34 support guide
35 tapered lip on support guide
36 outer end of support guide 37 wall inside sliding member
38 tapered inner portion of sliding member
39 axle extension
40 sliding member
41 sliding member with lip
42 lip on sliding member
43 end portion of sliding member (40)
44 spring for sliding member
46 retainer for spring
48 connecting rod
49 chamber for connecting rod
50 lip on connecting rod
52 push-button
54 locking pin
56 locking key
58 wall on push-button to hold locking pin
60 guide for locking pin
62 lip on locking pin
64 spring for locking pin

DESCRIPTION OF PREFERRED EMBODIMENT—FIGS. 1, 2, 4, 5, 6

Referring to FIG. 1, a push-button quick release safety hub assembly is illustrated. The assembly has a bicycle fork 10 attached to a pair of supports 12. The hub 20 has an axle 26, and a bearing race 22. Support 12 has an open ended slot 18 which slides down into groove on support guide 34. Support guide 34 has internal threads 31 which thread onto threaded portion of axle 24. Sliding members 40, 41 slide over axle ends 28 and encase outer ends of support guides 36. Sliding members 40, 41 interlock with coupling surface 14 on support 12. A spring 44 fits inside each sliding member 40, 41 and up against wall inside sliding member 37. Spring retainer 46 compresses spring 44. Spring retainer 46 is pressed or threaded onto axle end 28. Connecting rod 48 runs through the center of spring retainer 46, spring 44, sliding member 40, and support guide 34. Lip on connecting rod 50 presses or threads into end portion of sliding member 43. Connecting rod 48 continues all the way through axle 26 to outer end of axle 28. Connecting rod 48 continues through support guide 34, sliding member 41 with lip 42, spring for sliding member 44, spring retainer 46, and is pressed or threaded into chamber for connecting rod 49 in push button 52. Locking pin 54 is recessed into push button 52 and can be operated with key 56.

Figure 2:
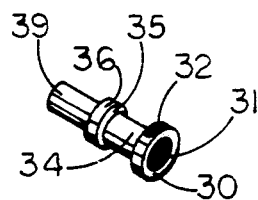
FIG. 2 shows an isometric view of an axle end converter.

FIG. 2 is an isometric view of an axle end converter. Axle end converter has internal threads on the support guide 31 and threads unto a standard axle end. Flats on the support guide 32 accept tool for tightening. Axle end converter has an axle extension 39 to support the following elements: sliding members 40, 41, springs 44, and spring retainers 46. Axle end converter has a support guide 34 to accept open ended slot 18 on support 12 (FIG. 1). Sliding members 40, 41 encase outer end of the support guide 36. Tapered lip on the support guide 35 fits into mounting taper 16 on support 12. Lip on the support guide 33 rests against inner face 13 of support 12. Inner face of the support guide 30 tightens up against bearing race 22 (FIG. 1).

Figure 4:
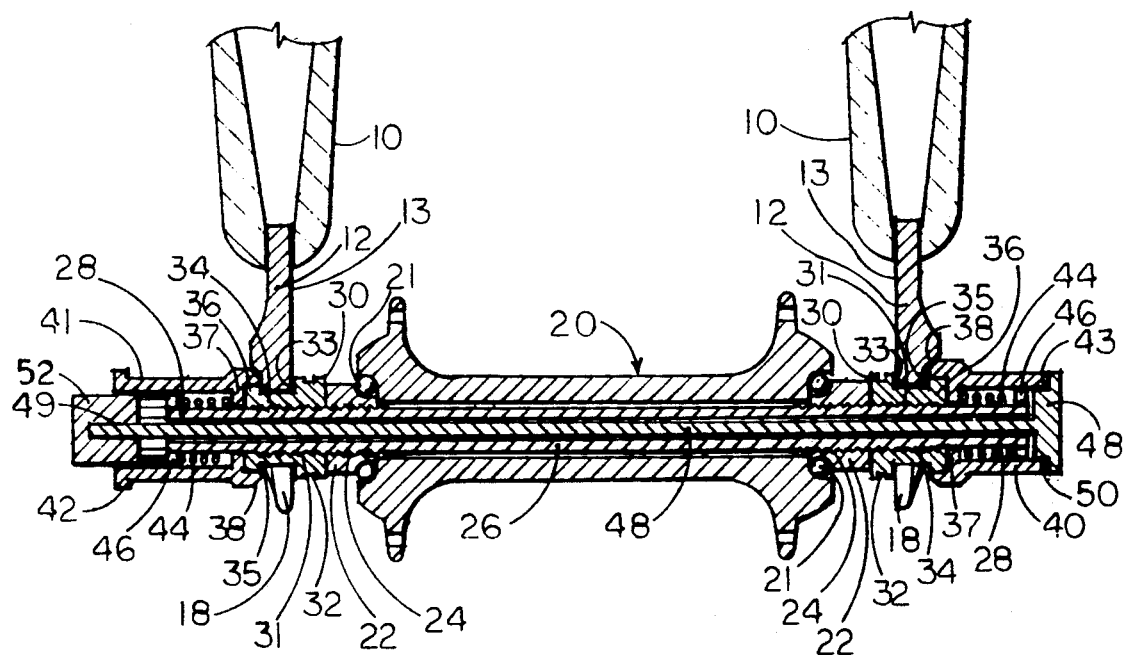
FIG. 4 shows a cross section of a fork attached to a support, and a longitudinal section of the hub assembly in an engaged position.

FIG. 4 shows a cross section of a fork attached to a support, and a longitudional section of the hub assembly in an engaged position. Standard bicycle hub assembly 20 has bearings 21 and bearing race 22, as is well known in the art. Bicycle fork 10 is attached to support 12. Support 12 has an inner face 13 that rests up against lip on support guide 33. Coupling surface 14 captures sliding members 40, 41, at taper 38. Mounting ramp 15 on support 12 allows easy entry of support 12 unto support guide 34. Mounting taper 16 on support 12 helps guide support 12 into support guide 34. Open ended slot 18 on support 12 fits over support guide 34. Tapered lip 35 on support guide mates with mounting taper 16 on support 12. Flats on support guide 32 accept tool for assembly.

Figure 3:
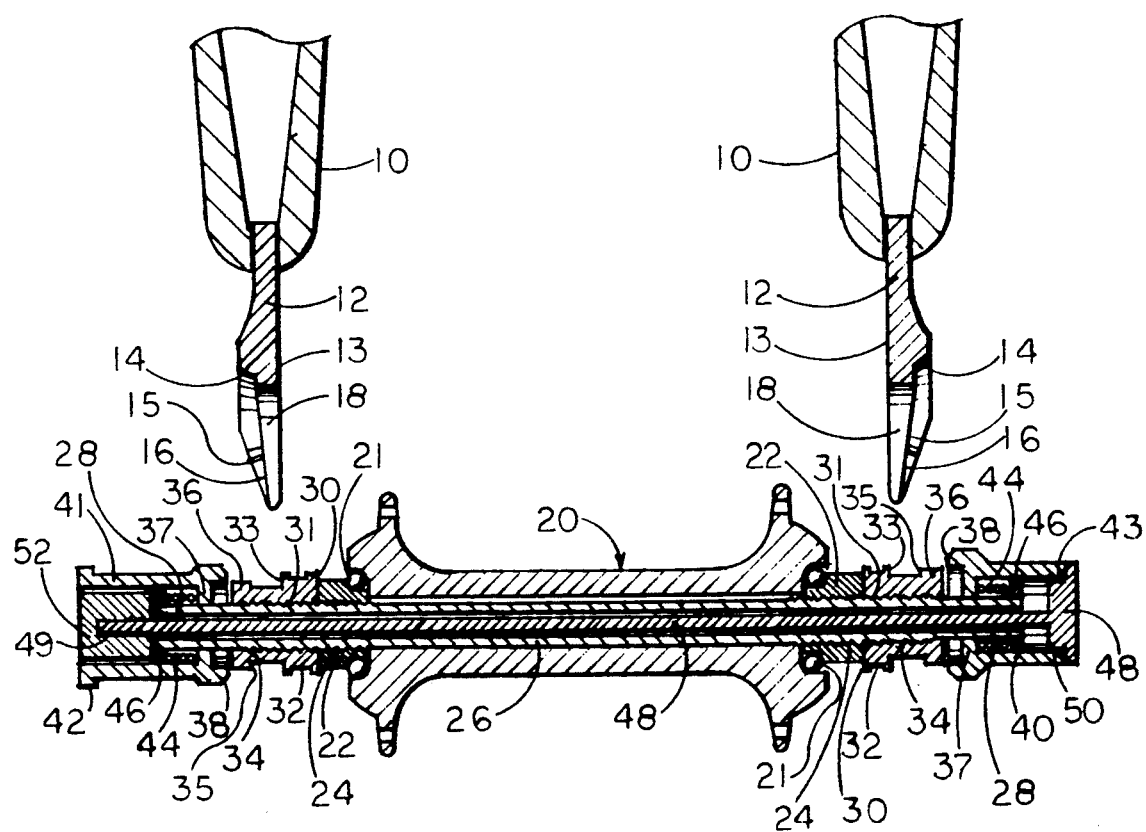
FIG. 3 shows a cross section of a fork attached to a support, and a longitudinal section of the hub assembly in a disengaged position.
Figure 5:
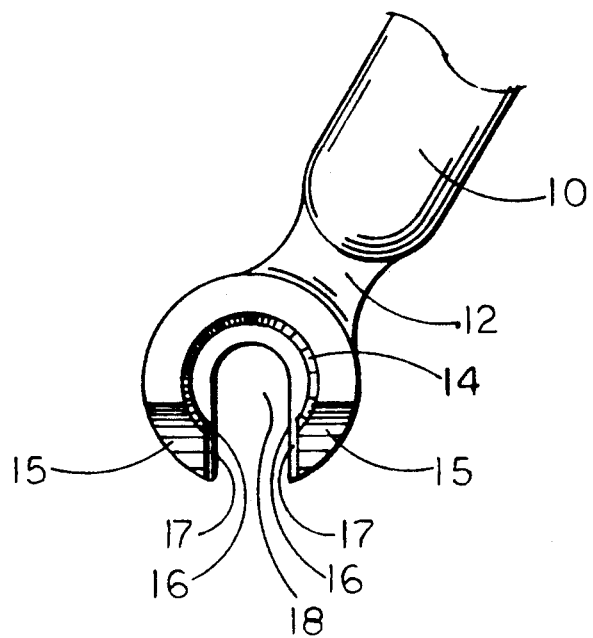
FIG. 5 shows an exterior side view of support attached to a bicycle fork.

FIG. 5 shows an exterior side view of a support attached to bicycle fork. Channel 17 on support 12 allows clearance for outer end of support guide 36 (FIG. 3). Mounting ramp 15 on support 12 urges sliding members 40, 41 outward (FIG. 3). Coupling surface 14 on support 12 captures sliding member and secures hub assembly to support 12.

Figure 6:
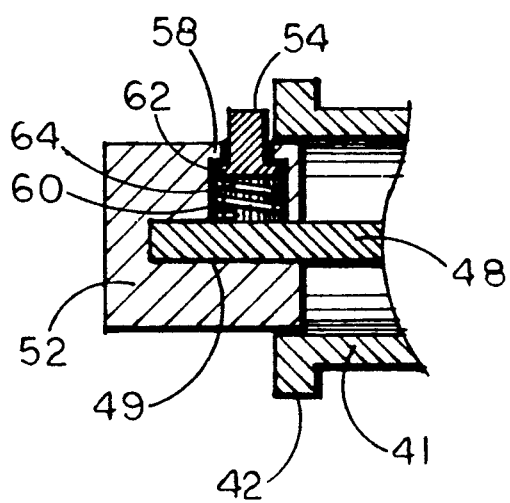
FIG. 6 shows an enlarged longitudinal section of a push button, locking pin, spring and sliding member in a locked position.

FIG. 6 is an enlarged longitudinal section of a push-button, locking pin, spring and sliding member in a locked position. Push button 52 has a chamber 49, that houses connecting rod 48. Locking pin 54 is held in place by a wall 58 on push button 52. Lip on locking pin 62 holds locking pin 54 in push button 52. Spring for locking pin 64 pushes locking pin 54 outward. Push button 52 is encased by sliding member 41, which has a lip 42.

OPERATION—FIGS. 1—6

The manner of using the push button quick release safety hub assembly to attach to a pair of supports will herewithin be described. FIG. 3 shows the hub assembly in a disengaging position. To disengage hub assembly from support 12, the following process is utilized. Press the push button 52 with your thumb, and pull the outer lip 42 on the sliding member 41 with your two fingers. The sliding members 40, 41 will then be disengaged from the coupling surfaces 14 of the supports 12. The hub assembly can then be removed by moving hub assembly away from support 12. Push button 52, is attached to connecting rod 48 that passes through axle 26 and is attached to sliding member 40. Sliding member 40 encases a spring 44 that urges sliding member 40 towards coupling surface 14 on support 12. By depressing push button 52, it pushes on the connecting rod 48. Connecting rod 48 pushes on end of sliding member 43 and moves sliding member 40 away form coupling surface 14 on support 12. By pulling lip 42 on sliding member 41, sliding member 41 is pulled away from coupling surface 14 on support 12. These two processes as just previously described, must be performed simultaneously in order for hub assembly to be removed from support 12. Ease of removal of hub assembly from support 12 is facilitated by mounting taper 16 on support 12. FIG. 3 shows hub assembly in previously described disengaging position. Drawings of thumb and fingers are not illustrated in FIG. 3.

Another embodiment (not shown in any drawings) of this invention involves elimination of push button 52 and connecting rod 48. However, two hands would be required to disengage hub assembly from support 12. Disengagement would only occur by simultaneously pulling sliding members 40, 41 away from coupling surface 14 on support 12. This procedure requires one hand on each sliding member. Removal of hub assembly from support is therefore more difficult. However, this embodiment of my invention would be less expensive to manufacture, and lighter in weight due to the reduced number of parts.

Referring to FIG. 4, a fork 10 is shown attached to support 12, that is secured to a push-button quick release safety hub assembly. In FIG. 4, hub assembly is illustrated in an engaged position. To engage support 12 to hub assembly, one pushes support 12 into support guide 34 and hub assembly will automatically secure itself to support 12. This is accomplished as described in the following process. Support 12 must be aligned with support guide 34. Mounting taper 16 on support 12 helps guide support 12 into support guide 34. Support 12 has a mounting ramp 15 that pushes on tapered inner portion of sliding member 38, thereby urging sliding members 40 & 41 in outward direction. Support guide 34 fits into open ended slot 18. Inner face of support 13 rests against lip on support guide 33. Mounting taper on support 16 rests up against tapered lip on support guide 35. Clearance between support 12 and support guide 34 will then become zero, and no lateral movement of hub assembly is possible. Channel on support 17 (FIG. 5) allows passage of outer end of support guide 36. Once open ended slot 18, mates with support guide 34, springs 44 inside sliding members 40, 41 will urge sliding members 40, 41 inward toward coupling surface 14 on support 12. when tapered inner portions 38 of sliding members 40, 41 engage with coupling surface 14 on support 12, sliding members 40, 41 are then captured by coupling surface 14. Sliding members 40, 41 are constantly forced inward toward coupling surface of support 14, by internal springs 44 in sliding members 40, 41. Thus, hub assembly is secured to supports 12, as shown in FIG. 4.

Another embodiment of this invention is illustrated in FIG. 6. A locking pin 54 that serves as a double safety measure against push button 52 and lip on sliding member 42 from moving in any direction. Therefore, sliding members 40, 41, cannot disengage from coupling surface 14 on support 12. Thus, hub assembly cannot disengage from support 12. Locking pin 54, is held outward by spring for locking pin 64. By pushing locking pin 54 inward, it becomes completely recessed within push button 52. Push button 52 can now enter sliding member 41 and sliding members 40, 41 are now able to move away from coupling surface 14 on support 12. Hub assembly can then be removed from support 12. Another feature of the locking pin is that it can be operated with a key 56 (FIG. 1) and lock (not shown in drawings) to prevent unauthorized wheel removal. Any lock and key assembly, known in the art can be utilized to operate locking pin as previously described.

FIG. 2 shows another embodiment of this invention. This drawing shows an axle end converter. The axle end converter modifies a standard bicycle axle end in order to function in the same manner as outer end of axle 28 and support guide 34 as shown in FIG. 1. Internal threads on support guide 31 will thread onto any standard bicycle axle as known in the art. Flats 32 on axle end converter accept tool for tightening axle end converter onto standard axle. Therefore the standard axle of a standard hub can be fitted with the axle end converter. Thus, the push-button quick release safety hub assembly can be utilized with any standard hub and axle as known in the industry.

SUMMARY, RAMIFICATIONS AND SCOPE

Accordingly, the reader will see that the push-button quick release safety hub assembly is a vast improvement over the standard quick release clamping assemblies which are so prevalent in the biking industry. The push button quick release safety hub assembly is needed in the industry due to the high failure rate of the current means for attaching hub assemblies to bicycle frames.

The push-button safety hub assembly will not disengage from the bicycle frame unless operator simultaneously presses push-button and pulls lip on sliding member. Disengagement of wheel from bicycle frame can be preformed with one hand in less than two seconds. Engagement of wheel to bicycle frame is accomplished by aligning supports with hub assembly and simply pushing them together. Hub assembly will automatically secured itself to bicycle frame in less that two seconds.

Estimating wheel alignment is no longer necessary. Push-button safety hub assembly provides perfect wheel alignment each and every time with no need to adjust or estimate wheel alignment. The push-button safety hub assembly requires no additional adjustments, alignment, loosening, tightening or mechanical expertise. It also eliminates the use of all bolts, screws, nuts, and washers, thus loosening or malfunction problems are eliminated.

The push-button safety hub assembly is lighter than the standard quick release clamping assembly. It is inexpensive to manufacture and can be used on any standard hub and axle assembly.

The push/button quick release safety hub assembly relies on spring tension to mount and hold wheel. It is unique in its ability to provide a safe, quick, easy-to-use quick release system. No other quick release system provides these unique advantages.

Although the description above contains many specificities, these should not be construed as limiting the scope of the invention but as merely providing illustrations of some of the preferred embodiments of this invention. For example, the push-button quick release safety hub assembly can be of different sizes, shapes, materials, and uses in other embodiments.

Thus the scope of the invention should be determined by the apppended claims and their legal equivalents, rather than by the examples given.

CLAIM TERMINOLOGY

"Axial, axially"—a direction or orientation essentially parallel to the axle. When this term is used in reference to a support, the axle is assumed to be oriented for mounting on the support.

"Inward, inside, inner"—directed toward, facing toward, or closest to, the opposite end of the axle, or the opposite support.

"Outward, outside, outer"—directed away from, facing away from, or farthest from, the opposite end of the axle, or the opposite support.

"Radial, radially"—a direction or orientation essentially perpendicular to the axle. When this term is used in reference to a support, the axle is assumed to be oriented for mounting on the support.

I claim:

1. A quick-release axle mounting system for mounting a wheel axle on an axle support, the support having a slot with an open end and a closed end, the mounting system comprising:
   an axially slidable member on an end of the axle, shaped to be gripped by human fingers, said member having an inner end;
   a coupling surface on the outer surface of the support, shaped to mate with the inner end of the slidable member to prevent radial movement of the slidable member toward the open end of the slot;
   a spring urging the slidable member inward toward the coupling surface; and, a fixed retainer on the axle end for retaining the outer end of the spring.

2. The axle mounting system of claim 1 further comprising:
   a support guide on the axle at the inner end of the slidable member, having a portion radially narrow enough to enter the slot, and, adjacent the narrow portion, inner and outer portions wider than the slot; and,
   a taper in the axial thickness of the support beside the slot, thick enough near the closed end of the slot to fill the axial clearance between the inner and outer portions of the guide, and thinner toward the open end of the slot to facilitate entry of the guide into the slot, whereby the guide is fixed axially relative to the support when the guide is pushed into the slot.

3. The axle mounting system of claim 2, further comprising a channel in the outer surface of the support along an edge of the slot, which accommodates the outer portion of the guide, and wherein the taper is between the channel and the inner surface of the support.

4. The axle mounting system of claim 3, wherein the inner end of the slidable member extends radially beyond the outer portion of the guide, and further comprising a mounting ramp on the support beside the channel, axially thinner toward the open end of the slot, so that the slidable member is wedged outward initially as the guide is pushed into the slot.

5. The axle mounting system of claim 1, further comprising an axle extension with internal threads that thread onto the axle end, wherein the slidable member, spring and retainer are mounted on the axle extension.

6. The axle mounting system of claim 1 for mounting the axle between two such supports, further comprising:
   a lip extending radially from the slidable member;
   a push button at the outer end of the slidable member;
   a second slidable member on the opposite end of the axle from the button;
   a second spring urging the second slidable member inward; and
   a control rod passing through the axle, attached to the button and to the second slidable member;
   whereby both slidable members are moved outward simultaneously with one hand by pulling outward on the lip with the fingers while pushing the button with the thumb.

7. The axle mounting system of claim 6, further comprising locking pin means in the button for releasably preventing axial motion of the button.

8. A quick-release axle mounting system for mounting a wheel axle between two axle supports, each support having a slot with an open end and a closed end, the mounting system comprising:
   a sliding member on each end of the axle, each sliding member having an inner end;
   a coupling surface on the outer surface of each support, shaped to mate with the inner ends of the sliding members, to prevent radial movement of said inner ends toward the open ends of the slots;
   spring means for urging the sliding members inward toward the coupling surfaces;
   a support guide on the axle at the inner end of each sliding member, having a portion radially narrow enough to enter the slots, and adjacent the narrow portion, an inner and outer portion wider than the slots; and,
   a taper in the axial thickness of the supports beside the slots, thick enough near the closed end of slots to fill the axial clearance between the inner and outer portions of the guides, and thinner toward the open end of the slots to facilitate entry of the guides into the slots, so that the guides are fixed axially relative to the supports when the guides are pushed into the slots.

9. The axle mounting system of claim 8, further comprising a channel in the outer surface of each support along an edge of the slot, which accommodates the outer portion of the guides, and wherein the taper is between the channel and the inner surface of the support.

10. The axle mounting system claim 9, wherein the inner ends of the sliding members extended radially beyond the outer portion of the guides, and further comprising a mounting ramp on each support beside the channel, axially thinner toward the open end of the slot, so that the sliding members are wedged outward initially by the ramps as the guides are pushed into the slots.

11. The axle mounting system of claim 8, wherein the support guides have internal threads for mounting the guides on the axle, and further comprising axle extensions on each support guide, wherein the sliding members are mounted on the axle extensions.

12. The axle mounting system of claim 8, further comprising:
   a lip extending radially from one of the sliding members;
   a push button in the outer end of said one member; and
   a control rod passing through the axle, attached to the button and to the sliding member at the opposite end of the axle;
   whereby both sliding members can be moved outward simultaneously with one hand by pulling outward on the lip with the fingers while pushing the button with the thumb.

13. The axle mounting system of claim 12, further comprising a locking pin device in the button which releasably prevents axial motion of the button.

14. A quick-release axle mounting system for mounting a wheel axle between two axle supports, each support having a slot with an open end and a closed end, the mounting system comprising:
   first and second slidable sleeves, one on each end of the axle, each sleeve having an inner end;
   spring means for elastically urging the sleeves inward;
   a support guide on the axle at the inner end of each sleeve, having a portion radially narrow enough to fit into the slots, and, adjacent the narrow portion, an inner and an outer portion wider than the slots;
   a channel on the outer surface of each support around the edge of the slot, which accommodates the outer wider portion of the support guides, and is enlarged around the closed end of the slot to additionally accommodate the inner end of the sleeves;
   a mounting taper in the axial thickness of each support, between the channel and the inner surface of the support, thick enough near the closed end of slot to fill the axial clearance between the inner and outer portions of the guides, and thinner toward the open end of the slot to facilitate entry of the guides into the slots; and, a mounting ramp on the outer surface of each support, beside the channel, axially thinner toward the open end of the slot, so that the sleeves are wedged outward initially, against the urging of the spring means, as the axle is pushed into the slots.

15. The axle mounting system of claim 14, further comprising:
   a push button in the outer end of the first slidable sleeve;
   a rod passing through the axle, connected between the push button and the second slidable sleeve; and,
   a lip extending radially from the first slidable sleeve;
   whereby both sleeves can be moved outward simultaneously with one hand, by pulling outward on the lip with the fingers while pushing the button with the thumb, which moves both sleeves outward against the urging of the spring means.

16. The axle mounting system of claim 14, further comprising an axle extension threaded onto each end of the axle, wherein the support guides, sleeves, and spring means are mounted on the axle extension.

* * * * *